United States Patent Office
3,652,535
Patented Mar. 28, 1972

3,652,535
KASUGAMYCIN DERIVATIVES
John G. Keil, Manlius, and Richard H. Schreiber, Canastota, N.Y., assignors to Bristol-Myers Company, New York, N.Y.
No Drawing. Filed May 1, 1970, Ser. No. 33,865
Int. Cl. C07c 47/18
U.S. Cl. 260—210 R    3 Claims

ABSTRACT OF THE DISCLOSURE

Semi-synthetic kasugamycin derivatives have been found useful in the treatment of diseases caused by bacterial infection. These derivatives can be prepared by the use of the intermediate compound, Bios C (5-[2-carbobenzoxamido-2,3,4,6-tetradeoxy - 4 - amino-α-D-arabinohexopyranosyl]-[1R:2S:3S:4R:5R:6R]-inositol).

BACKGROUND OF THE INVENTION (1) Field of the invention

The kasugamycin derivatives of the present invention are compounds useful as intermediates in the preparation of compounds useful in the treatment of bacterial infections.

(2) Description of the prior art

The novel compounds of the present invention are derivatives of the antibiotic, kasugamycin, which is itself commercially available in Japan and which is described in U.S. Pat. No. 3,358,001.

Some semi-synthetic derivatives of kasugamycin are described in U.S. Pat. No. 3,480,614, which issued Nov. 25, 1969. The compounds of the present invention can be used to prepare the compounds described in U.S. 3,480,-614 in addition to other such kasugamycin derivatives. None of the compounds of the present invention are considered obvious in view of prior art.

COMPLETE DISCLOSURE

This invention relates to new derivatives of kasugamycin (U.S. Pat. No. 3,358,001) which are useful as intermediates in the preparation of semi-synthetic kasugamycin derivatives. More particularly, it relates to compounds having the formula

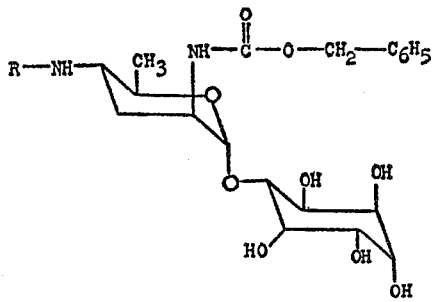

I wherein R is hydrogen or a radical of the formula

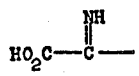

which may also be represented as having the formula

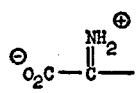

since the radical can exist as a zwitterion.

The parent antibiotic substance, kasugamycin, is an effective agent for use in the treatment of infections caused by a variety of bacteria, examples of which are Pseudomonas, Klebsiella, Salmonella, Escherichia, Shigella, and Brucella.

It was an object of the work described in U.S. Pat. No. 3,358,001 to prepare derivatives of kasugamycin possessing increased antibiotic potency.

The object was achieved by the compounds of that invention, which are characterized as having the formula

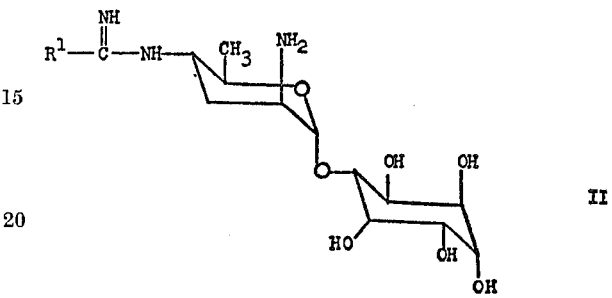

II in which $R^1$ is (lower)alkyl.

An object of this invention is to provide improved methods of synthesis for the preparation of compounds characterized by Formulae II and V. The object was achieved, by the provision according to the present invention, of the process for the synthesis of compounds having the formula

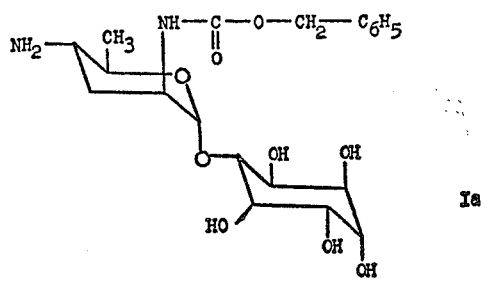

Ia which comprises the consecutive steps of:
(A) Treating kasugamycin having the formula

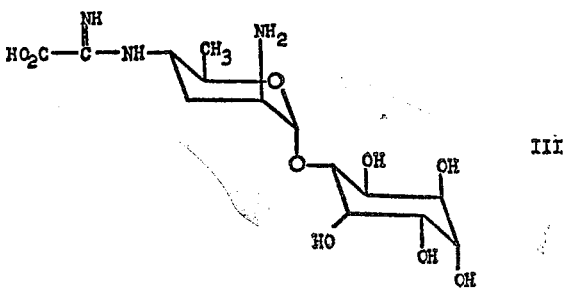

III or an acid addition salt thereof, particularly the monohydrochloride salt, with at least one molar equivalent, but preferably about 1 to about 5 molar equivalents, and the most preferably about 2.5 molar equivalents of carbobenzoxy chloride per mole of compound III at a controlled pH above 7, but preferably in the range of about 7 to about 11, and most preferably about 8, said pH controlled by the addition of a base selected from the group comprising an alkali metal hydroxide or alkaline earth metal hydroxide, but preferably sodium or potassium hydroxide, in a heterogeneous aqueous-water immiscible organic solvent system, said water immiscible organic solvent being selected from the group comprising ethyl acetate, methyl isobutylketone, diethyl ether, chloroform, methylene chloride, and the like, but preferably ethyl acetate, for a period of time of at least 30 minutes following the completion of the addition of the carbobenzoxy chloride, but preferably for a time period of about 30 minutes to 5 hours, and most preferably about one hour, at a temperature in the range of about 0° C. to about 50° C., but preferably at about 10° C. to 35° C., and most preferably at about room temperature (20° to 25° C.) to produce a compound having the formula

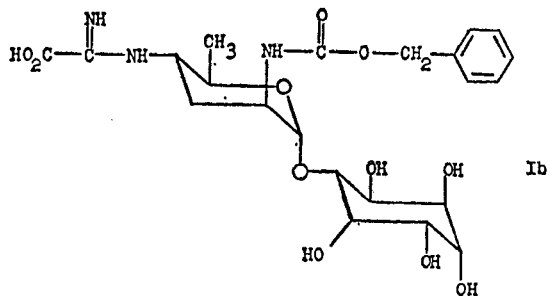

Ib and (B) Treating compound Ib or an acid addition salt thereof, with hydrazine in a ratio of at least one molar equivalent of hydrazine per mole of Ib, but preferably in a ratio of 1 to 5 moles of hydrazine per mole of Ib, and most preferably in a molar ratio of about 3 moles of hydrazine per mole of Ib, in an organic solvent, preferably in a (lower)alkanol selected from the group comprising methanol, ethanol, n-propanol, isopropanol, n-butanol, sec-butanol, tert-butanol, and the like, but most preferably methanol or ethanol, at a temperature of 0° C. to about 60° C., but preferably at about 20° C. to about 50° C., and most preferably at about 35° C. to about 40° C. with stirring for a period of at least 30 minutes after the hydrazine addition, but preferably for about 30 minutes to about 4 hours, and most preferably for about 45 minutes to about 75 minutes to produce the compound having Formula Ia.

The compounds of the present invention are more advantageously used as intermediates, as compared to the dimedone intermediates of U.S. Pat. 3,480,614, for the preparation of certain semi-synthetic kasugamycin derivatives, especially the one characterized as having the formula

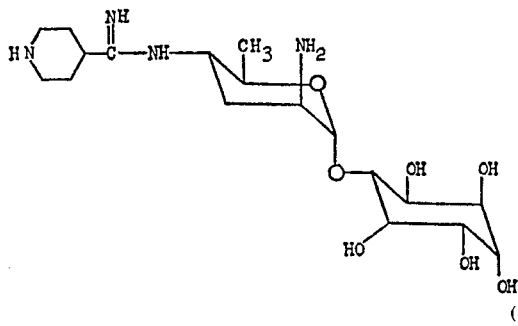

(V)

A preferred embodiment of the present invention is the compound having the formula

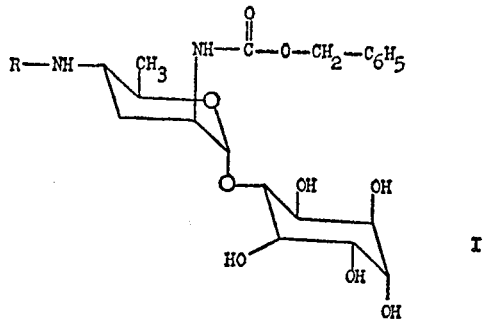

I in which R is hydrogen or a radical of the formula

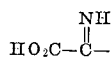

A most preferred embodiment is the compound of Formula I, wherein R is hydrogen.

Another most preferred embodiment is the compound of Formula I, wherein R is

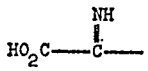

STARTING MATERIALS (A) Methyl acetimidate and its preparation is described in U.S. Pat. No. 3,480,614.

(B) Preparation of methyl 4-pyridinecarboximidate:

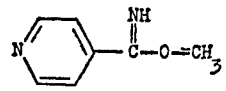

4-cyanopyridine (5.2 g.) was dissolved in 50 ml. of methanol and 270 mg. of sodium methoxide was added to the solution. The solution was allowed to stand at room temperature for 24 hours, following which carbon dioxide gas was bubbled into the solution to destroy the sodium methoxide. The solution was evaporated to dryness in vacuo and the residue was extracted with boiling cyclohexane. The product crystallized from the cyclohexane upon cooling to yield 3.5 g. of title product; M.P. 50° C.; the infrared (IR) and nuclear magnetic resonance (NMR) spectra were consistent with the structure.

(C) 4-pyridinealdoxime chloride hydrochloride and its preparation is described by Paul and Tchelitcheff, Bull. Soc. Chim. France, 2217 (1962).

EXAMPLE 1

Preparation of the carbobenzoxy derivative of kasugamycin (Ib):

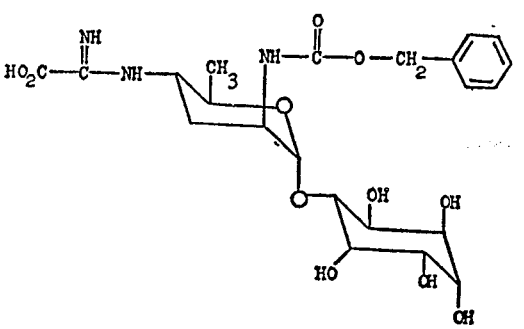

Ib

Six grams (14.4 millimoles) of kasugamycin monohydrochloride were dissolved in a solution of 2.9 grams (34.56 millimoles) of sodium bicarbonate in 544 ml. of water (0.53 percent solution) and stirred at 25° C. for 30 to 45 minutes.

Nineteen and six tenths ml. (144.5 millimoles; 24.66 grams) of carbobenzoxy chloride (Mann Research), equivalent to a 10 molar excess, were added directly to the stirred solution at 25° C. Stirring was continued for 20 hours, after which time the solution was extracted with ethyl acetate to remove the small amount of insoluble material present. The aqueous phase was then concentrated in vacuo azeotropically with n-butanol. The solid material was redissolved in 25 to 50 ml. to dry methanol, and the solid inorganic material removed by filtration. The methanolic solution is poured into 1500 ml. acetone with vigorous stirring. After approximately 15 minutes, the white solid was removed by filtration and dried in vacuo over sulfuric acid. 7.32 grams (98.7 percent theory) of title product was obtained, M.P. 175° C. The infrared (IR) and nuclear magnetic resonance (NMR) spectra were consistent with the desired structure.

*Analysis.*—Calcd. for $C_{22}H_{31}O_{11}N_3 \cdot H_2O$ (percent): C, 49.71; H, 6.26; N, 7.90. Found (percent): C, 49.54; H, 5.98; N, 7.84.

EXAMPLE 2

Preparation of 5-[2-carbobenzoxamido-2,3,4,6-tetradeoxy-4-amino-α-D-arabinohexopyransoyl] - [IR:2S:3S:4R:5R:6R]-inositol (Bios C: Ia)

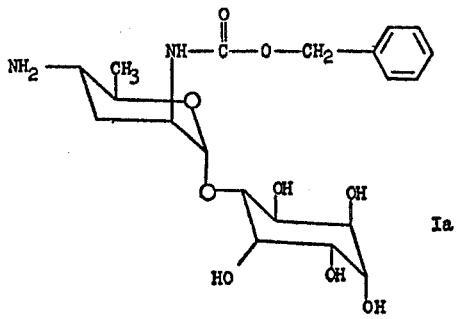

Ia

Two grams (3.89 millimoles) of Compound Ib were dissolved in 20 ml. of water at 25° C. with stirring. 0.67 ml. of 85 percent hydrazine hydrate (Fisher Scientific) (11.67 millimoles; 0.584 gram) was added directly at 25° C., and the mixture stirred at this temperature for 24 hours. The solution was then concentrated in vacuo with n-butanol. The solid material was redissolved in 20 to 30 ml. of hot methanol, and a yellow, methanol insoluble fraction (amounting to 250 to 350 mg.) removed by filtration. The methanolic solution was poured into 1,000 ml. of acetone with vigorous stirring. After approximately 15 minutes, the white solid was filtered and dried in vacuo over sulfuric acid to produce 1.3 to 1.4 grams (75 to 81 percent theory) of the title compound, M.P. with decomposition 195° C. to 205° C. The IR and NMR spectra were consistent with the structure of the product.

*Analysis.*—Calcd. for $C_{20}H_{30}O_9N_2 \cdot 2H_2O$ (percent): C, 50.20; H, 7.18; N, 5.86. Found (percent): C, 50.80; H, 6.65; N, 5.71.

EXAMPLE 3

Preparation of 5 - [2 - amino - 2,3,4,6 - tetradeoxy-4-(4-piperidylcarboxamidino) - α - D - arabinohexopyranoxyl]-[IR:2S:3S:4R:5R:6R]-inositol (V)

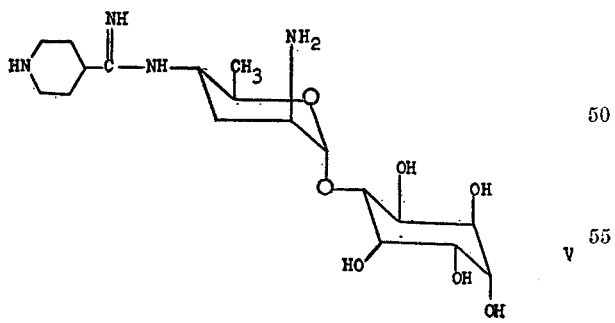

V 4-pyridinealdoxime chloride hydrochloride (1.93 g., 0.01 mole) was dissolved in a small amount of methanol and was added to a solution of Compound Ia (4.4 g., 0.01 mole) in methanol (150 ml.) containing triethylamine (3.0 g., 0.03 mole). The solution was stirred at room temperature until thin-layer chromatograms[1] indicated that most of the starting material had reacted. After 48 hours the solution was evaporated to dryness at 50° C. on a rotary evaporator, redissolved in 100 ml. of 0.1 N hydrochloric acid and hydrogenated at 50 p.s.i. over 10% Pd on charcoal (0.5 g.). When no more hydrogen was absorbed, the catalyst was removed by filtration, the filtrate neutralized with a liquid anion exchange resin (LAl),[2] and the water was removed by azeotropic distillation in vacuo with n-butanol. The dry residue was dissolved in warm methanol (50 to 100 ml.), the sodium chloride sorbed, the catalyst was removed by filtration, the filtrate solids removed by filtration, and the solids of the filtrate precipitated by the addition of 10 volumes of acetone (yield, 4.7 g.).

The crude solids (4.7 g.) were dissolved in water (25 ml.) and placed on a column (2 cm. x 30 cm.) of CG 120 cation exchange resin[3] in the hydrogen form. The column was washed with 25 ml. of water, 1,000 ml. of N HCl and again with water, and finally eluted with 0.1 N NaOH. The neutral and basic fractions were collected, dried at pH 7 in a rotary evaporator at 50° C., and again dissolved in a minimum of hot methanol. The methanol solutions were filtered and the solids therein were precipitated by addition of a large excess of acetone. The various fractions collected from the column by elution with sodium hydroxide were assayed for their minimum inhibitory concentrations (MIC) against *E. coli*. The fraction having the lowest MIC (858 mg.) was dissolved in methanol (5 ml.) and placed on a column of acid-washed alumina (0.75 cm. x 30 cm.). Different fractions were then eluted with methanol. The fraction having the best bioassay (lower MIC) against *E. coli*. (156 mg.) was characterized by IR and NMR and was determined to be consistent with the desired structure; M.P. with decomposition at about 200° C.

EXAMPLE 4

Preparation of the carbobenzoxy derivative of kasugamycin (Ib)

(A) Substitution in the procedure of Example 1 for the 10 molar excess of carbobenzoxy chloride used therein of a 5 molar quantity of carbobenzoxy chloride produced comparable results.

(B) Substitution in the procedure of Example 1 for the 10 molar excess of carbobenzoxy chloride used therein of a 2.5 molar quantity of carbobenzoxy chloride produced comparable results.

EXAMPLE 5

Preparation of 5 - [2 -amino - 2,3,4,6 - tetradeoxy - 4-acetamidino - α - D - arabinohexopyranosyl] - [IR:2S:3S:4R:6R]-inositol (VI)

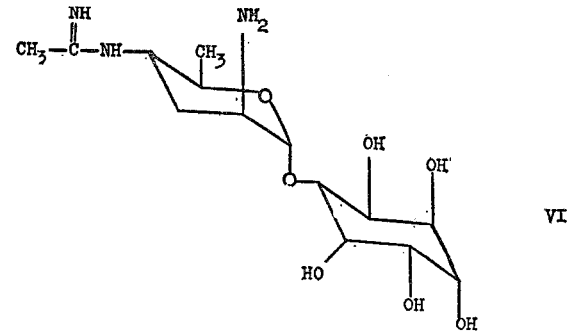

VI

A 10 g. portion of compound Ia is added to 175 ml. of refluxing methanol. The pH is adjusted to 7.1 with methanolic HCl to produce complete solution. The solution is refluxed for a 48 hour period and during this time a total of 29 g. methyl acetamidate hydrochloride (266 mmoles) is added in about 12 small portions. After each addition methanolic sodium methoxide solution is added until a pH meter reading of 7.0–7.4 is obtained. The reaction mixture is then cooled, methanolic HCl added to a pH reading of 5.5 and the solution concentrated to a volume of 70 ml. The insoluble material is removed by filtering

---

[1] Thin-layer chromatograms were developed on silica gel G or H plates with a mixture of methyl acetate, 2-propanol and ammonium hydroxide (4.5 : 10.5 : 6.0) and Avicel plates with 1-propanol, pyridine, water, acetic acid (150 : 100 : 120 : 30) as the developer. Spots were visualized by a Ninhydrin spray or by bio-autographs.

[2] Rohm and Haas secondary amine anion exchanger.

[3] Rohm and Haas chromatographic grade sulfonic acid resin.

and discarded and the clear filtrate then concentrated in vacuo to dryness.

The residue is redissolved in 100 ml. of 0.1 N hydrochloric acid and hydrogenated at 50 p.s.i. over 10% Pd on charcoal (0.5 g.). When no more hydrogen is absorbed, the catalyst is removed by filtration, the filtrate neutralized with a liquid anion exchange resin (LA1), and the water is removed by azeotropic distillation in vacuo withh n-butanol. The dry residue is dissolved in warm methanol (50 to 100 ml.), the sodium chloride solids removed by filtration, and the solids of the filtrate precipitated by the addition of 10 volumes of acetone.

The crude solids are dissolved in water (35 ml.) and placed on a column (2 cm. x 30 cm.) of CG 120 cation exchange resin in the hydrogen form. The column is washed with 25 ml. of water, 1,000 ml. of N HCl and again with water, and finally eluted with 0.1 N NaOH. The neutral and basic fractions are collected, dried at pH 7 on a rotary evaporator at 50° C., and again dissolved in a minimum of hot methanol. The methanol solutions are filtered and the solids therein are precipitated by addition of a large excess of acetone. The various fractions collected from the column by elution with sodium hydroxide are assayed for their minimum inhibitory concentrations (MIC) against *E. coli*. The fraction having the lowest MIC is dissolved in methanol and placed on a column of acid-washed alumina (0.75 cm. x 30 cm.) and eluted with the same solvent. The fraction having the best bioassay (lowest MIC) against *E. coli* is characterized by IR and NMR and is determined to be consistent with the desired structure.

EXAMPLE 6

Preparation of 5-[2-amino-2,3,4,6-tetradeoxy-4-(4-piperidylcarboxamido) - α - D - arabinohexopyranosyl]- [1R:2S:3S:4R:5R:6R]-inositol "Bios C" (9.9 g., 0.02 mole) was dissolved in 50 ml. of methanol to which solution was added 2.72 g. (0.02 mole) of methyl 4-pyridinecarboximidate and 2 g. of triethylamine. The solution was refluxed for eight hours. When thin layer chromatography indicated the continued presence of unreacted "Bios C," a second equivalent of the imidate was added and the pH was adjusted to about pH 7 with glacial acetic acid. The solution was evaporated in vacuo, the residue then dissolved in 1 N hydrochloric acid and hydrogenated at 50 lb./in.² over 10% palladium on charcoal (500 mg.).

After the hydrogen uptake ceased, the catalyst was removed by filtration and the filtrate was neutralized by admixture with liquid resin LA1.

The aqueous solution was evaporated in vacuo and the residue was extracted with hot methanol (75 ml.). The methanolic solution was poured into 1 liter of acetone and the resultant precipitate was collected by filtration, then air dried to yield 6 g. of solid product which was then assayed against *E. coli* according to the procedure described in columns 8 and 9 of U.S. Pat. No. 3,480,614.

3.5 g. of the material thus obtained was dissolved in a minimum quantity of water and placed on a column (1.5 x 25 cm.) of G.C. 120 ion exchange resin. The column was washed with water on 1 N HCl and then eluted with 0.1 N sodium hydroxide. The various fractions collected were evaporated in vacuo and assayed against *E. coli*. Those fractions assaying at greater than 600 mcg./ mg. as compared to kasugamycin as standard (381 mg. total solids) were dissolved in hot methanol and chromatographed on acid-washed alumina. The most active fraction thus obtained had an activity of about 1400 mcg./mg. as compared to kasugamycin against *E. coli*.

Table I illustrates the activity of the purified compound when assayed against a selected variety of bacteria. The compound 5 - [2-amino-2,3,4,6-tetradeoxy-4-acetamidino-α - D - arabinohexopyranosyl] - [1R:2S:3S:4R:5R:6R]-inositol (VI) was included for comparison purposes (Example 10, U.S. Pat. No. 3,480,614).

TABLE I

Minimum inhibitory concentrations (MIC) in mcg./ml.

| Organism | Bristol Code | Compound VI | Compound V |
|---|---|---|---|
| Ps. aeruginosa | A-9925 | 32 | ≤2 |
| Ps. aeruginosa | A-9931 | 16 | ≤2 |
| E. coli Juhl | A-15119 | 125, 63 | 8 |
| E. coli Squibb | A-15010 | 8 | ≤2 |
| E. coli BRL | A-0559 | 125 | 16 |
| K. pneumoniae | A-9867 | 16 | 4 |
| K. pneumoniae | A-9977 | 2 | ≤2 |
| K. pneumoniae [1] | A-9977 | 4 | 4 |
| Pr. mirabilis | A-9900 | 1,000 | 32 |
| Pr. morganii | A-0636 | 125 | ≤2 |
| Pr. morganii | A-15153 | 125 | 8 |
| Sal. enteritidis | A-0531 | 16 | 4 |
| Sal. paratyphi | A-9530 | 4 | ≤2 |
| Sal. typhosa | A-9498 | 8 | ≤2 |
| Ps. aeruginosa | A-9843A | 4 | 4 |
| Ps. aeruginosa | A-9930 | 8 | ≤2 |
| Ser. marcescens | A-9933 | 4 | ≤2 |
| Ent. aerogenes | A-9432 | 32 | 4 |

[1] 50% serum.

We claim:
1. A compound having the formula

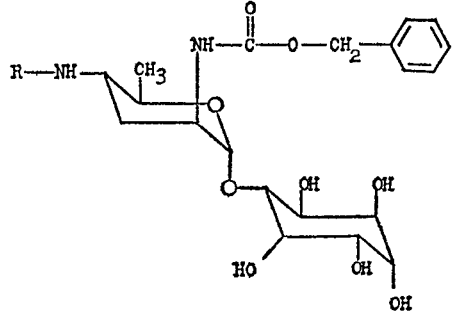

in which R is hydrogen or a radical having the formula

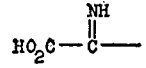

or an acid addition salt thereof.
2. The compound of claim 1, in which R is hydrogen.
3. The compound of claim 1, in which R is a radical of the formula

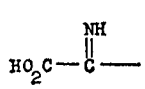

References Cited

UNITED STATES PATENTS 3,480,614   11/1969   Cron et al. _____ 260—210

LEWIS GOTTS, Primary Examiner

J. R. BROWN, Assistant Examiner